US008874604B2

(12) United States Patent  
Cai et al.

(10) Patent No.: US 8,874,604 B2  
(45) Date of Patent: Oct. 28, 2014

(54) METHOD AND SYSTEM FOR SEARCHING AN ELECTRONIC MAP

(75) Inventors: Keke Cai, Beijing (CN); Rui Ma, Beijing (CN); Zhong Su, Beijing (CN); Xiao Xun Zhang, Beijing (CN); Hui Jia Zhu, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 407 days.

(21) Appl. No.: 12/871,181

(22) Filed: Aug. 30, 2010

(65) Prior Publication Data

US 2011/0055187 A1    Mar. 3, 2011

(30) Foreign Application Priority Data

Aug. 31, 2009 (CN) .......................... 2009 1 0168367

(51) Int. Cl.
     *G06F 17/30*        (2006.01)
(52) U.S. Cl.
     CPC .................................. *G06F 17/3087* (2013.01)
     USPC ......................................................... 707/765
(58) Field of Classification Search
     None
     See application file for complete search history.

(56) References Cited

U.S. PATENT DOCUMENTS

| | | | |
|---|---|---|---|
| 6,504,571 B1 | 1/2003 | Narayanaswami et al. | |
| 7,685,119 B2 * | 3/2010 | Riise et al. | 707/999.005 |
| 7,739,276 B2 * | 6/2010 | Lee et al. | 707/723 |
| 7,937,402 B2 * | 5/2011 | Feng et al. | 707/759 |
| 8,250,613 B2 * | 8/2012 | Faulkner et al. | 725/86 |
| 2006/0080286 A1 * | 4/2006 | Svendsen | 707/3 |
| 2007/0276845 A1 * | 11/2007 | Geilich | 707/100 |
| 2008/0005071 A1 | 1/2008 | Flake et al. | |
| 2008/0154856 A1 * | 6/2008 | Riise et al. | 707/3 |
| 2008/0243783 A1 * | 10/2008 | Santi et al. | 707/3 |
| 2009/0287669 A1 * | 11/2009 | Bennett | 707/4 |
| 2010/0257162 A1 * | 10/2010 | Buron et al. | 707/723 |

FOREIGN PATENT DOCUMENTS

| | | |
|---|---|---|
| CN | 101295319 A | 10/2008 |
| CN | 101350013 A | 1/2009 |

OTHER PUBLICATIONS

Overell et al. Geographical Co-occurrence as a Tool for GIR published Nov. 2007.*

Multiple Evidence Combination in Image Retrieval: Diogenes Searches for People on the Web, Aslandogan et al., published 2000 by ACM.*

Searching the Web with Mobile Images for Location Recognition, Yeh et al. published 2004 by IEEE.*

Using Semantic Contents and WordNet in Image Retrieval, Aslandogan et al. published 1997 by ACM.*

(Continued)

*Primary Examiner* — Kevin L Young  
(74) *Attorney, Agent, or Firm* — Scully, Scott, Murphy & Presser, P.C.; Jennifer Davis, Esq.

(57) ABSTRACT

A method and system for searching an electronic map. The method includes the steps of: receiving a query entered by a user for searching the electronic map; extracting place names in the query; extracting in web pages searched on a computer network co-occurrence place names that co-occurred with the place names; selecting extension place names from the co-occurrence place names, thereby obtaining a set of extension place names; generating a set of queries, wherein the set of queries includes the query entered by the user, and includes a query obtained by replacing the place names in the query entered by the user with each extension place name in the set of extension place names respectively; and sending the set of queries to a map search engine.

9 Claims, 8 Drawing Sheets

(56) References Cited

OTHER PUBLICATIONS

Getty Trustm Getty Thesaurus of Geographical Names Online as of Mar. 3, 2005, https://web.archive.org/web/20050303172335/http://www.getty.edu/research/conducting_research/vocabularies/tgn/.*

CHristel et al. Interactive Maps for a Digital Video Library IEEE 2000.*

Feng Jing, et al. "VirtualTour: An Online Travel Assistant Based on High Quality Images", http://www.photosig.com/go/photos/view?id=733881.

* cited by examiner

METHOD AND SYSTEM FOR SEARCHING AN ELECTRONIC MAP

CROSS REFERENCE TO RELATED APPLICATION

This application claims priority under 35 U.S.C. 119 from Chinese Patent Application 200910168367.3, filed Aug. 31, 2009, the entire contents of which are incorporated herein by reference.

BACKGROUND OF THE INVENTION

1. Field of the Invention

The present invention generally relates to computer network application, more particularly, to electronic map search on a computer network.

2. Description of Related Art

World Wide Web (Web) provides people with a great number of practical services. Electronic map is such a map-based Web service. Some search services (such as Google, Baidu and Sogou etc) have integrated with electronic map service, and user may use the electronic map function in these search services to query information of a certain spot and plan travel line, time, etc. In order to efficiently utilize electronic map search, it is required to provide an accurate place name during electronic map search. However, user sometime can not provide an accurate address for a place. For example, in a city, there may be different place names for a same geographic location, i.e., formal place name, common place name, and the place name that had been used but has been abandoned. During the electronic map search, if a place name contained in the query entered by a user does not exist (actually, does not exist in the electronic map), the expected search result may not be obtained immediately.

Providing image in electronic map search service is very useful. For example, if one has never been to a certain spot, the image about that spot (spot image) can provide him with description about that spot. However, with respect to the wide spot space, the number of spot images that can be provided by electronic map search service is still very limited.

To provide more spot images, some map search engines search images on Web (such as images uploaded by network users) through an image search engine, however, since many images do not match spots of electronic map, the map search engine can not utilize images on Web very well. This is due to the search of a current image search engine is one that based on simple keyword matching. The image search engine searches images based on keyword (e.g. place name keyword) in an image query, and if there is an image that matches the keyword (e.g. the surrounding text of the image contains the keyword), then the returned result will contain the target image, otherwise, there is no image in the returned result.

FIG. 1A-1D represents an illustrative procedure of an electronic map search application ("Google search map") in the art. As shown in FIG. 1A, on the map search page, a user enters a query [北京, 双榆树中学, 麦当劳], the query result page returned by search system shows "your search for 双榆树中学, 麦当劳 near 北京 did not match any locations", and it also shows a suggestion of "search the web for 北京, 双榆树中学, 麦当劳"; if the user follows the suggestion and clicks the link "北京, 双榆树中学, 麦当劳" to search the web, as shown in FIG. 1B, the query result page returned by search system includes a query result "麦当劳双榆树店". If the user clicks the link "麦当劳双榆树店", the search system switches from network search to map search and shows a page as shown in FIG. 1C, which includes an introduction to "麦当劳双榆树店" and provides the function of "查看地图 (view map)"; if the user clicks "查看地图", the system returns to the electronic map as shown in FIG. 1D and marks location (1) of "麦当劳双榆树店" on the electronic map.

FIG. 2A-2C is another example of applying "谷歌地图搜索 (Google map search)". As shown in FIG. 2A, on map search page, a user enters a query [北京, 哑巴路, 麦当劳], the query result page returned by search system shows "在北京周边 找不到匹配哑 巴路, 麦当劳 的任何地点", and it also shows a suggestion of "在网络中 搜索北京, 哑巴路, 麦当劳"; if the user follows the suggestion and clicks the link "北京, 哑巴路, 麦当劳", the search system will return a query result page as shown in FIG. 2B, all the query results contained therein are information keyed on "麦当劳" and there is no information about "哑巴路". Then, the user has to enter a query "北京, 哑 巴路" on the network search page, the search page returns a first page of query result pages as shown in FIG. 2C, in which a headline of the first item located at the top of that page is a headline about "亦庄 '哑巴路'", the content below headline "北 京地名的雅化 与俗化" located at the bottom relates to "哑巴胡同", and below the headline "大米的个人空间" of the third item at the middle part of that page is the following introduction "北京东城区和 朝阳区相汇之处, 老地名叫' 。距今约七 哑巴路' 十年前, 这里搬来了 一位城防人员—— 一黄绍雄将军。他嫌这个地名不 太雅, 便改为' 雅 宝路'". The user needs to read query result pages (on which there are tens of thousands of query results) so as to make further judgment; if fortunately, the user correctly determines that "哑巴路" should be replaced by "雅宝路" from the introduction of "大米的个人空间", then the user can enter a query [北京, 雅宝路, 麦当劳] on the map search page to perform search.

In the above two examples, whether the query entered by a user is [北京, 双榆树中学, 麦当劳] or [北京, 哑巴路, 麦当劳], all the result pages returned by the search system do not directly include the object to be looked up by the user. The user needs to analyze different situations, switch between a network search page and a map search page, attempt to enter different queries, finally it is possible to obtain the object to be queried by the user.

SUMMARY OF THE INVENTION

In accordance with one aspect of the present invention, a method for searching an electronic map includes the steps of: receiving a query entered by a user for searching the electronic map; extracting first place names in the query; extracting in web pages searched on a computer network co-occurrence place names that co-occurred with the first place names; selecting extension place names from the co-occurrence place names, thereby obtaining a set of extension place names; generating a set of queries, wherein the set of queries includes the query entered by the user, and includes a query obtained by replacing the place names in the query entered by the user with each extension place name in the set of extension place names respectively; and sending the set of queries to a map search engine. At least one of the foregoing steps is performed by a programmed data processing system.

In accordance with another aspect of the present invention, a system for searching an electronic map includes: query receiving means for receiving a query entered by a user for searching the electronic map; place name extracting means for extracting place names in the query; co-occurrence place name extracting means for extracting in web pages searched on a computer network co-occurrence place names that co-occurred with the place names; extension place name selecting means for selecting extension place names from the co-occurrence place names, thereby obtaining a set of extension place names; query set generating means for generating a set of queries, wherein the set of queries includes the query entered by the user, and includes a query obtained by replacing the place names in the query entered by the user with each extension place name in the set of extension place names respectively; and query sending means for sending the set of queries to a map search engine.

BRIEF DESCRIPTION OF THE DRAWINGS

Objects, features and advantages of the present invention will be more apparent from the detailed description of the exemplary embodiments in the drawings. The same or similar reference numbers in the drawings generally denote the same or similar components or parts in the exemplary embodiments.

DETAILED DESCRIPTION OF PREFERRED EMBODIMENTS

Figure 1A:
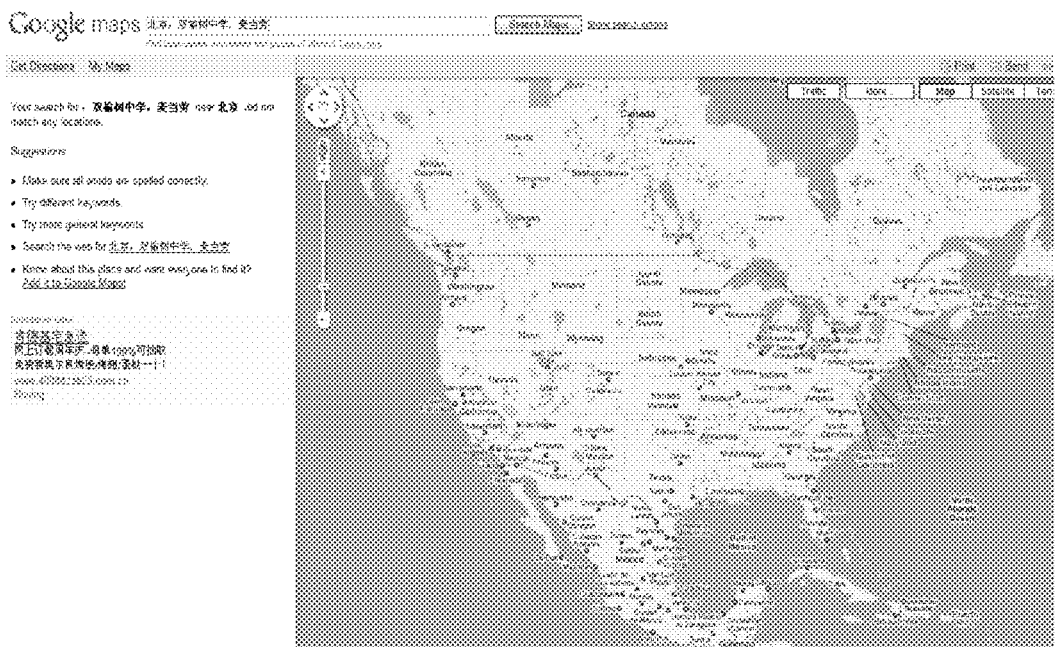
FIG. 1A-1D schematically represents a procedure of searching an electronic map according to the prior technology.
Figure 1B:
Figure 1C:
Figure 1D:
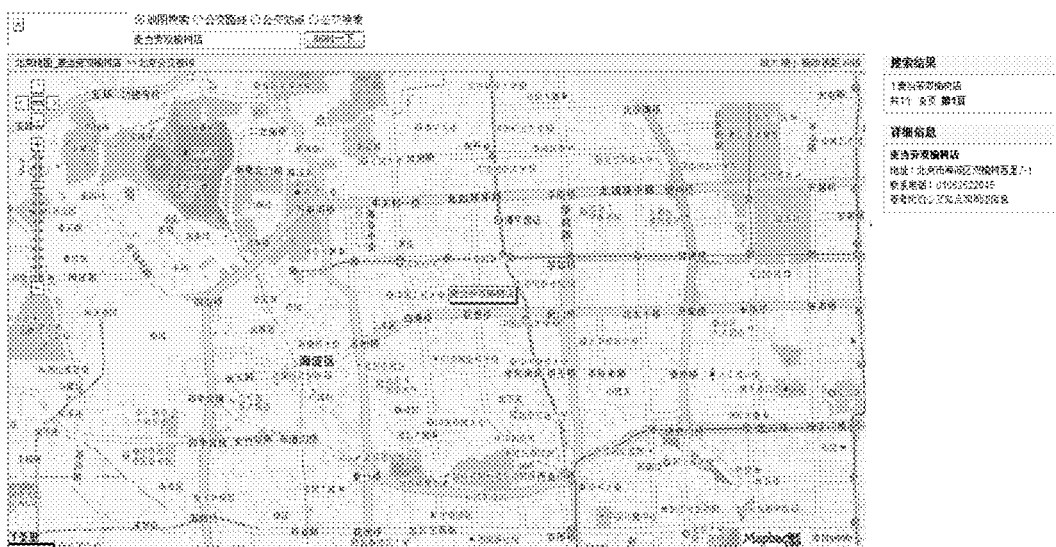

An object of the present invention is to improve the method and system for searching an electronic map in the prior art.

To this end, in an aspect of the present invention, a method for searching an electronic map is provided, including: receiving a query entered by a user for searching the electronic map; extracting place names in the query; extracting in web pages searched on a computer network co-occurrence place names that co-occurred with the place names; selecting extension place names from the co-occurrence place names, thereby obtaining a set of extension place names; generating a set of queries, wherein the set of queries includes the query entered by the user, and includes a query obtained by replacing the place names in the query entered by the user with each extension place name in the set of extension place names respectively; sending the set of queries to a map search engine.

In another aspect, a system for searching an electronic map is provided, including: query receiving means for receiving a query entered by a user for searching the electronic map; place name extracting means for extracting place names in the query; co-occurrence place name extracting means for extracting in web pages searched on a computer network co-occurrence place names that co-occurred with the place names; extension place name selecting means for selecting extension place names from the co-occurrence place names, thereby obtaining a set of extension place names; query set generating means for generating a set of queries, wherein the set of queries includes the query entered by the user, and includes a query obtained by replacing the place names in the query entered by the user with each extension place name in the set of extension place names respectively; query set sending means for sending the set of queries to a map search engine.

In yet another aspect, a search service system on a computer network is provided, including: a search engine, wherein, the search engine including an electronic map search engine; a system for searching an electronic map, including: query receiving means for receiving a query entered by a user for searching the electronic map; place name extracting means for extracting place names in the query; co-occurrence place name extracting means for extracting in web pages searched on a computer network co-occurrence place names that co-occurred with the place names; extension place name selecting means for selecting extension place names from the co-occurrence place names, thereby obtaining a set of extension place names; query set generating means for generating a set of queries, wherein the set of queries includes the query entered by the user, and includes a query obtained by replacing the place names in the query entered by the user with each extension place name in the set of extension place names respectively; query set sending means for sending the set of queries to a map search engine.

By extending location names in a query entered by a user, the present invention facilitates overcoming the problems that a map search engine can not find geographic location, an image search engine can not find spot image or the number of spot images provided is not sufficient under a search manner of simple keyword matching, thereby improving user's experience in search service.

The implementation of the present invention is described in detail with reference to the drawings. However, those skilled in the art should appreciate that the present invention can be implemented in various forms, and it should not be understood as limited by specific embodiments as shown and as described below; and in the description of the embodiments, technical details that can be practiced in the art are omitted as much as possible, and such description and omission are intended to make those skilled in the art to more thoroughly and fully understand the essential of the present invention.

Figure 3:
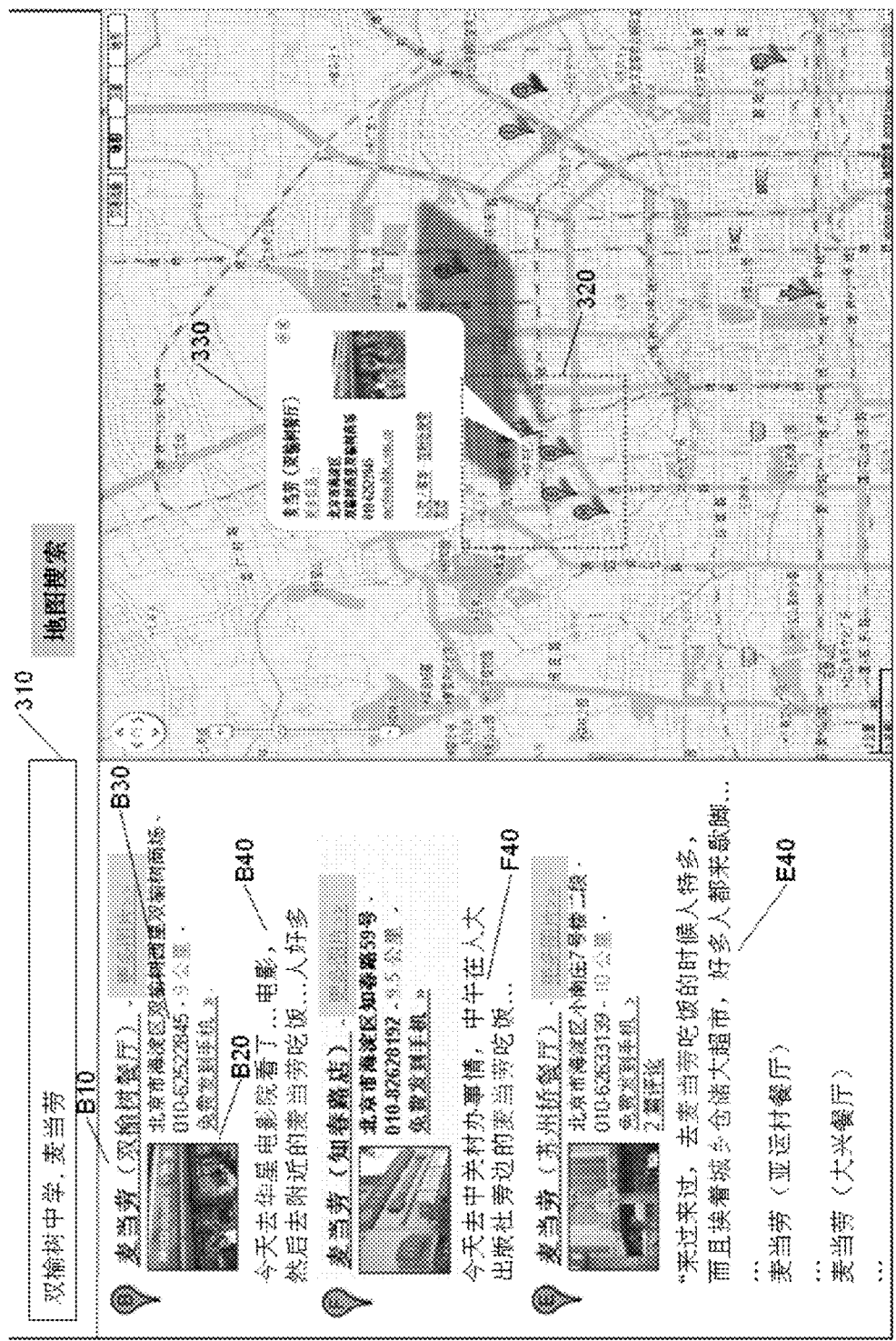
FIG. 3 schematically represents a procedure of searching an electronic map according to an embodiment of the present invention.

FIG. 3 illustratively represents a procedure of performing electronic search according to an embodiment of the method of the present invention. As shown in FIG. 3, on map search page, a user enters a query [双榆树中学，麦当劳] 310, the search system returns a query result page.

FIG. 3 shows the first page of the query result, it shows a part of the electronic map at the right side, and balloon-shaped letter marks A-H are marked on the electronic map for indicating locations of the searched objects on the electronic map, in which A and F are covered by a float window 330 but can appear as the float window moves. The dashed-line block 320 on the electronic map represents a local region that the user query focuses on, which can be specified through a pointer input device (for example, a mouse) by the user.

FIG. 3 shows at the left side detailed content about the searched "麦当劳", in which there are headlines specified by 3 balloon-shaped letter marks B, F and E: B-麦当劳（双榆树餐厅）B10; F-麦当劳（知春路店）and E- 麦当劳（苏州桥餐厅）。

The query result indicated by mark B at the left side of FIG. 3 further includes information such as image B20, address and telephone number B30, comments B40 etc. Wherein, the content of comments B40 includes 华星电影院 . . . ·附近的麦当劳" relating to place names; similarly, the content of comment F40 of mark F also includes "人大 . . . 旁边的麦当劳" relating to place names, the content of comment E40 of mark E also includes "麦当劳 . . . 挨着城乡仓储" relating to place names.

In comparison to the examples shown in FIGS. 1A-1D, after a user enters a query [双榆树中学，麦当劳], the query result page returned by the search system directly includes the objects to be found by the user.

Figure 4:
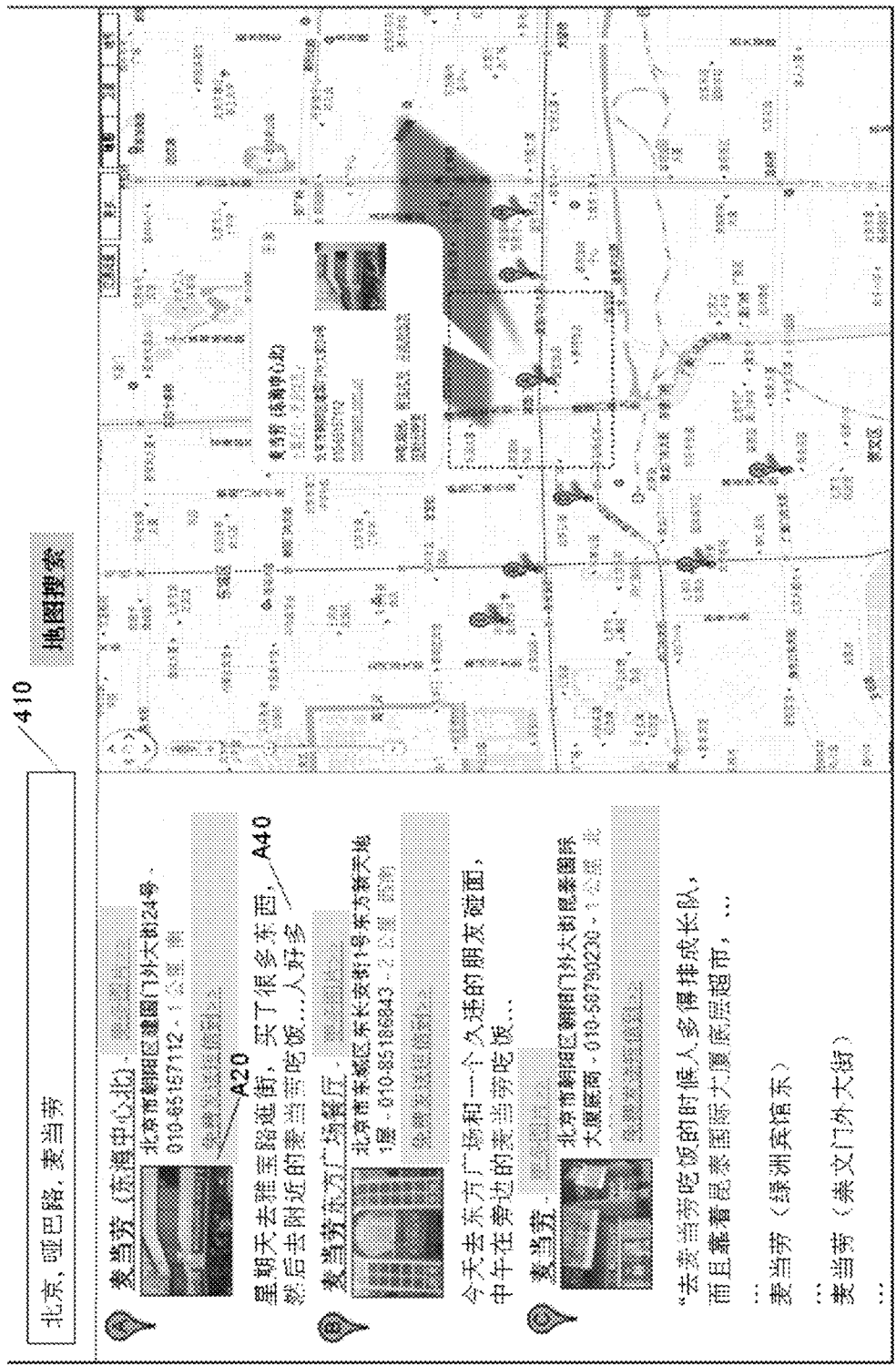
FIG. 4 schematically represents a procedure of searching an electronic map according to another embodiment of the present invention.

FIG. 4 illustratively represents a procedure of performing an electronic search according to another embodiment of the method of the present invention. As shown in FIG. 4, on map search page, a user enters a query [北京,哑巴路，麦当劳] 410, the search system returns a query result page.

FIG. 4 shows the first page of the query result, it shows a part of the electronic map at the right side, which is similar to the right side of FIG. 3.

FIG. 4 shows at the left side detailed content about the searched "麦当劳", for example, the headline of the balloon-shaped letter mark A is "麦当劳（东海中心北）"; the descriptive text A40 below that headline is "星期天去雅宝路逛街 . . . 附近的麦当劳". The query result page also provides an image A20; if the user clicks "更多图片" on the page, more images will be displayed.

Figure 2A:
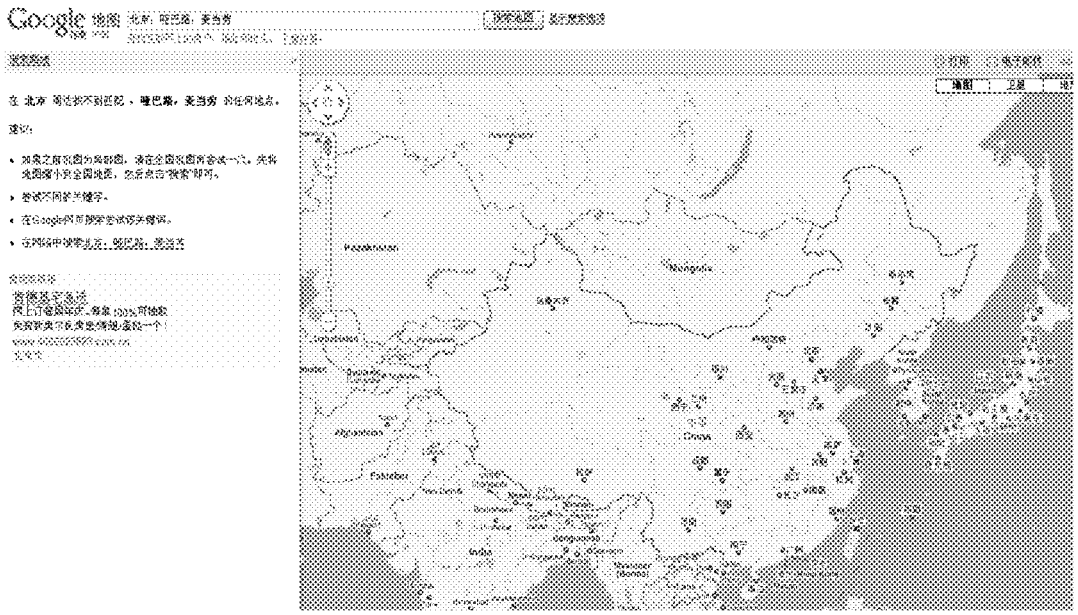
FIG. 2A-2C schematically represents another procedure of searching an electronic map according to the prior technology.
Figure 2B:
Figure 2C:

In comparison to the example shown in FIG. 2A, after a user enters a query [北京，哑巴路，麦当劳], the query result page returned by the search system directly includes the objects wanted by the user.

These two embodiments according to the method of the present invention as shown in FIGS. 3 and 4 differ significantly from the effects of electronic map search in the prior art. The implementation of the present invention will be described below in detail with reference to accompany drawings.

First, referring to FIG. 5, a procedure of searching an electronic map of the present invention will be described in detail in connection with the embodiment shown in FIG. 3.

Figure 5:
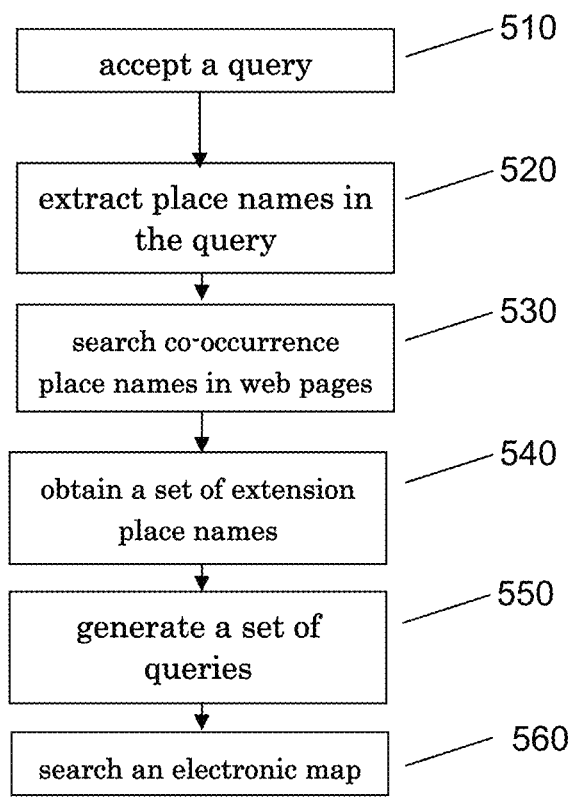
FIG. 5 schematically represents a flowchart of a method according to an embodiment of the present invention.

FIG. 5 illustratively represents a flow chart of a method according to an embodiment of the present invention. Note that the method of the embodiment of the present invention may be implemented in a network environment in the art, for example, human-machine interactive interface and various search engines of the search system in the art can be used to implement the method of the present invention without substantial alteration.

The method of the embodiment of the present invention begins with step 510, i.e. an electronic map search system (also referred to as "search system") receives a query entered by a user. The user enters a query, such as [双榆树中学, 麦当劳], through a query input field of electronic map search provided by the search system on a computer terminal connected with the search system via a network (FIG. 3, 310). The object to be searched by the user is "麦当劳 (Mc-Donald's)" nearby "双榆树 中学".

In step 520, the search system extracts place names in the query. After the search system receives the query entered by the user, it recognizes that "双榆树中学" in the query is a place name, or, it functions as a place name, then the system extracts "双榆树中学" as the place name in the query.

According to an embodiment of the present invention, the above recognition can be performed by using Named Entity Recognition (NER) technique, by which it can be known that "双榆树中学" is not only a name of a organization but also a name of a place in the above query.

A person skilled in the art knows that Named Entity Recognition is a type of natural language processing technology in the art for recognizing an entity having specific meanings in the text (mainly including person name, place name, institution name, proper nouns etc), and is an important basic tool in such application fields as information extraction, syntax analysis, machine translation, web page analysis and the like. The present invention does not relate to NER technology per se, thus the detailed content of NER technology will not be described herein. However, when implementing the present invention, place names in the query entered by the user may be recognized by NER technology, and as described below, place names in web pages may be recognized by using NER technology.

In step 530, co-occurrence place names in web pages searched on a computer network that co-occurred with the place names are extracted. The co-occurrence place name refers to other place name that co-occurred with a place name (e.g. "双 榆树中学") in a same web page.

According to an embodiment of the present invention, the step of searching co-occurrence place names can be divided into two phases.

In the first phase, web pages containing the extracted place names are searched on the web. The search system can submit the place name "双榆树中学" extracted in step 520 to a web page search engine (for example, the web page search engine of Google or Baidu), then the web page search engine searches web pages containing "双榆树中学" on the web and the returned search result is a set of web pages.

In the second phase, each web page in the set of web pages returned by web page search engine are analyzed by using NER technology, other place names (i.e. co-occurrence place names) that co-occurred with the place name "双榆树中学" in that web page are recognized, and these co-occurrence place names are extracted.

According to an embodiment of the present invention, all the web pages returned by web page search engine in the first phase may be analyzed. According to another embodiment of the present invention, in case that the number of web pages returned by web page search engine is tremendous, only a small portion of all the web pages returned by web page search engine (e.g. the first 1000 web pages) may be analyzed, generally, such number is sufficient to obtain the required result while improving efficiency and saving time.

In step 540, a set of extension place names is obtained from the co-occurrence place names. That is, according to a certain criteria, a portion of co-occurrence place names are selected from the co-occurrence place names extracted in step 530 as extension place names, thereby obtaining a set of extension place names.

According to an embodiment of the present invention, a co-occurrence place name is selected as an extension place name based on times of its occurrence in web page. For example, a threshold value for times of occurrence may be set, e.g. 1000, and when a certain co-occurrence place name's times of occurrence in a web page exceeds 1000, that place name is extracted as extension place name; that is, all the place names whose times of occurrence in a web page exceeds 1000 are extension place names. Also, for example, occurrence times of place names on the web page may be ranked, and then the place names that rank at the top are extracted as extension place names. For example, the co-occurrence place names extracted in step 530 include place names "双榆树", "华星", "双安", "当代", "人大" that all located within one local region adjacent to "双榆树中学" and whose occurrence times on web page rank at the top 5, and then the place names "双榆树", "华星", "双安", "当代", "人大" can be extracted as extension place names. The set consisting of such extension place names {"双榆树", "华星", "双安", "当代", "人大"} is referred as extension place name set.

In step 550, a set of queries is generated, in which the set of queries includes the query entered by the user and a query obtained by replacing the place names in the query entered by the user with each extension place name in the set of extension place names respectively.

For example, a query [双榆树, 麦当劳] is obtained by replacing the place name "双榆树中学" in the query [双榆树中学, 麦当劳] entered by the user with extension place name '双榆树' acquired in step 550; similarly, queries [华星, 麦当劳], [双安, 麦当劳], [当代, 麦当劳], [人大, 麦当劳] corresponding to other extension place names are obtained, as a result, a set of queries={[双榆树中学, 麦当劳], [双榆树, 麦当劳], [华星, 麦当劳], [双安, 麦当劳], [当代, 麦当劳], [人大, 麦当劳]} is generated.

The description of steps 520-550 is directed to the query [双榆树中学, 麦当劳] entered by a user. However, if the query entered by the user is [北京, 哑巴路, 麦当劳], i.e. the object is "麦当劳" "雅宝路", the set of queries can also include [北京, 雅宝路, 麦当劳] through the above steps. Particularly, after the search system receives [北京, 哑巴路, 麦当劳] in step 510, "哑巴路" is recognized as a place name by using, for example, NER technology and "哑巴路" is extracted in step 520. In step 530, the web page search engine searches web pages containing "哑巴路" on the web, and a web page in the returned set of web pages has such text paragraph: "北京东城区 和朝阳区 相汇之处, 老地名叫' 哑巴路'。距 今约七十年前, 这里搬来了 一位城防人员 ——黄绍维将军。他嫌这个地名不 '太雅', 便改为 '雅宝路' ". NER technology is applied to that text paragraph of the web page, and other place names that co-occurred in that text paragraph with place name "哑巴路" are extracted as co-occurrence place names, e.g. "朝阳区", "东城区", "雅宝路". It is known to a person skilled in the art that NER technology may also be used to perform semantics analysis on text paragraph of the web page, for example, it can be determined whether "朝阳区", 东城区", "雅宝路" has alias relationship with "哑巴路" from some manually collected and formulated rules (e.g. based on "老地名", "以前 叫做", "过去叫 做", "曾经叫做", "后来改叫" etc. in the context), thereby it is concluded that "哑巴路" is an alias or former name of "雅宝路". Accordingly, it can be prescribed that "雅宝路" is preferentially selected as an extension place name in step 540. Thus, the set of queries generated in step 550 will include the query [北京, 雅宝路, 麦当劳].

After the set of queries is generated in step 550, the procedure turns to step 560, and the set of queries generated in step 550 is sent to a map search engine. Thus, what is received by the map search engine is not the query originally entered by the user, and the electronic map will be searched for each query in the set of queries and query result is returned.

According to an embodiment of the present invention, the search system can further define a set of extension place names through specified region entered by a user. For example, in step S510, a user can enter [北京, 双榆树中学, 麦当劳] instead of [双榆树中学, 麦当劳], which further defines the location, that is, the local geographic region of this query is "北京"; in this case, during generation of the set of extension place names, the search system will remove place names whose geographic locations are outside the specified region "北京" from co-occurrence place names. Also, for example, when a user enters a query [双榆树中学, 麦当劳], the user clicks a location on the electronic map through a pointer input device (for example, a mouse), or draw a circle or a block near a location on the electronic map (for example, the dashed-line block indicated by mark 320 in FIG. 3), so as to represent local geographic region of the query; based on the represented local geographic region, the search system will remove place names whose geographic locations are outside the represented local geographic region from co-occurrence place names during the generation of the set of extension place names.

According to an embodiment of the present invention, after the map search engine receives a set of queries, an image search engine (e.g. Google Image or Baidu Image) can be called to perform image search. The query result returned by the image search engine is a set of images aggregated by all images of hit objects (e.g. 麦当劳). As such, the query result returned to the user by the search system not only includes the location of the spot to be queried in the map, but also includes relevant images of the spot to be queried.

According to an embodiment of the present invention, before the images are returned to the user or presented to the user as a part of the query result, the presentation order of the images in the set of images is further ranked, so as to present the images ranking at the top to the user. One direct approach is to perform the ranking based on information provided by the text surrounding the images. Particularly, the text surrounding each image in the set of images can be obtained by using text indexing of the image search engine. Then, by analyzing the number of co-occurrence place names in the surrounding text, the image corresponding to the surrounding text that contains more co-occurrence place names is ranked at the top. Also, the relationship between co-occurrence place names in the text surrounding images and the objects to be queried by user can be analyzed through clue words (e.g. "邻近的", "旁边的", "对面的", "隔壁的" and the like), and then the images are ranked; for example, the text surrounding a certain image includes "中午在人大出版 社旁边的麦当劳吃饭 . . .", i.e. there is a specific relationship represented by clue word "旁边的" between co-occurrence place name "人大" and the query object "麦当劳", generally such image can be ranked at the top, as shown in FIG. 3.

It is to be noted that, there are various manners in the prior art to display ranking of search result (e.g. images) to a user, those skilled in the art can make choices based on different considerations and strategies when implementing the present invention, and the details thereof will not be described herein.

Figure 6:
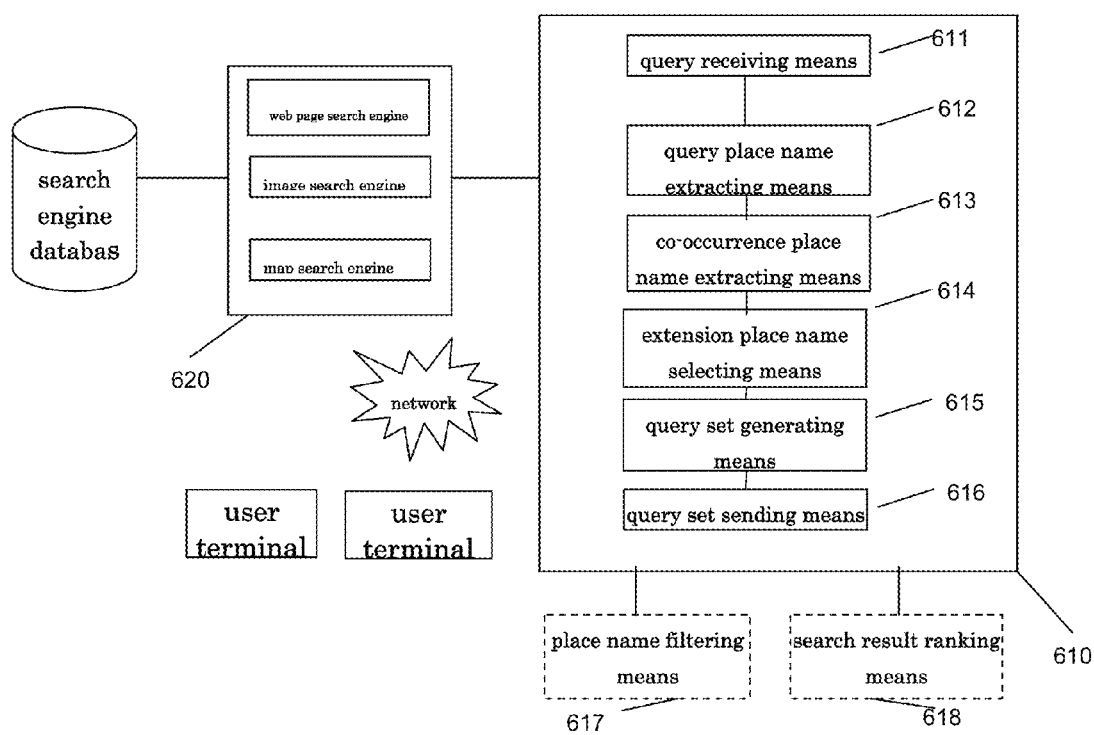
FIG. 6 schematically represents a block diagram of a system and an operating environment thereof according to an embodiment of the present invention.

According to a same inventive concept, the present invention also provides a system for searching an electronic map. FIG. 6 schematically represents a block diagram of a system for searching an electronic map and an operating environment thereof according to an embodiment of the present invention.

The operating environment of system 610 for searching an electronic map includes a search engine 620 on a computer network and one or more user terminals. The search engine 620 may further include various specialized search engines, for example, map search engine or electronic map search engine, web page search engine, image search engine etc. User may enter a query into search engine 620 on the user terminal, and obtain corresponding query result from the search engine. As shown in the figure, system 610 is communicatively coupled to search engine 620 via a computer network, and is capable of interacting with the user terminal through the computer network. It is to be noted that system 610 may also be integrated with existing search engine 620 or various specialized search engines to form a search engine having enhanced function.

The system 610 may implement the function of the method shown in FIG. 3, as shown, system 610 accordingly includes: query receiving means 611; query place name extracting means 612; co-occurrence place name extracting means 613; extension place name selecting means 614; query set generating means 615; query set sending means 616.

Query receiving means 611 is used to receive a query entered by a user for searching an electronic map. For example, when user enters a query [双榆树中学, 麦当劳] in an electronic map search interface provided on a browser of user terminal, the query will be transmitted to the query receiving means 611. In a specific implementation, the query receiving means 611 can directly receive a user's query, or can receive a query from a user forwarded from a search engine.

The query place name extracting means 612 is used to extract place names in the query entered by the user and received from the query receiving means. For example, place name "双榆树" is extracted from the query [双榆树中学, 麦当劳] entered by user. As described above in connection with step 520 of FIG. 5, the query place name extracting means 612 may extract place names by using NER technology.

The co-occurrence place name extracting means 613 is used to extract co-occurrence place names that co-occurred with the place names in web pages searched on a computer network. According to an embodiment of the present invention, the co-occurrence place name extracting means 613 may further include means for extracting web pages containing the place names and means for recognizing co-occurrence place names. As described above in connection with step 530 of FIG. 5, the means for extracting web pages containing the place names may call a network search engine to search and query the web pages containing place names (e.g. "双榆树中学") extracted by the place name extracting means 612, and then the means for recognizing co-occurrence place names recognizes and extracts place names that co-occurred with "双榆树中学" in web pages, i.e. co-occurrence place names, by using NER technology, for example.

The extension place name selection means 614 is used to select extension place names from the co-occurrence place names, thereby obtaining a set of extension place names. As described above in connection with step 540 of FIG. 3, based on a certain criteria, for example, based on whether occurrence times of a co-occurrence place name in web pages exceeds a predetermined threshold or whether it is ranked at the top, a portion of co-occurrence place names are selected from the co-occurrence place names extracted by the co-occurrence place name extracting means 613 as extension place names, thereby obtaining a set of extension place names, for example {"双榆树", "华星", "双安", "当代", "人大"}.

The query set generation means 615 is used to generate a set of queries, wherein the set of queries includes the query entered by user, and includes a query obtained by replacing place names in the query entered by user with each extension place name in the set of extension place names acquired by the extension place name selecting means 614 respectively. For example, in the example, the query set generating means 615 may generate a set of queries { [双榆树中学, 麦当劳], [双榆树, 麦当劳], [华星, 麦当劳], [双安, 麦当劳], [当代, 麦当劳], [人大, 麦当劳] }.

The query set sending means 616 is used to send the set of queries to a map search engine. After the map search engine receives the set of queries, it can perform search just like it receives a query entered directly by a user, for example, search objects for each query in the set of queries and then returns the query result. The returned result may be directly sent to a user terminal for displaying, and may also be forwarded through system 610 to a user terminal for displaying.

The map search engine may also call the image search engine to perform image search on the set of queries, thus the returned result may also include spot images of the spot to be queried by the user.

The function of the system 610 described above may be further enhanced. As shown in FIG. 6, the system 610 may further include a search result ranking means 618 for ranking preferential presentation order of query results—for example, images in the set of images returned by the image search engine—according to a certain strategy and criteria, thereby the query results (e.g. images) whose preferential presentation order ranks at the top can be presented to a user preferentially. A person skilled in the art knows that, in a specific implementation, corresponding strategy and criteria can be formulated and designed according different query results; and the search result ranking means 618 may also be a part of the search engine 620 to enhance or improve an existing search result ranking mechanism in the search engine.

FIG. 6 also shows a place name filtering means 617. According to an embodiment of the present invention, the place name filtering means 617 may be used to further define co-occurrence place names extracted by the co-occurrence place name extracting means 613 and/or extension place names selected by the extension place name selecting means 614; for example, the place name filtering means 617 may remove a place name (e.g. "南京") whose geographic location is outside a specified region from the co-occurrence place names or extension place names according to a place name (e.g. "北京") in the query entered by the user, and in response to a geographic region specified on the electronic map by the user through a pointer device (e.g. a mouse, a touch screen), may also remove a place name whose geographic location is outside the geographic region from the co-occurrence place names or extension place names; a person skilled in the art knows that these manners and functions are functions existing in the art or can be implemented with little modification, thus they will not be described here in detail. However, a person skilled in the art should appreciate that, the application of place name filtering means 617 during a proper phase of operating of system 610 will help to obtain query results more accurately and more quickly. Of course, as described above for search result ranking means 618, the place name filtering means 617 may also be a part of the search engine 620 to enhance and improve an existing place name filtering mechanism in the search engine.

The system 610 for searching an electronic map of the present invention has been described above briefly, it is to be appreciated that the above description omits many same or similar details as the description of a method of the present invention. However, those skilled in the art can implement functions of various implementations of the present invention described above on the system 610 for searching an electronic map search of the present invention.

Although the present invention and exemplary embodiments thereof are described above with reference to accompany drawings, it should be appreciated that the present invention is not strictly limited to these embodiments, and those skilled in the art can make various changes and modifications to embodiments without departing from the scope and spirit of the present invention. All such changes and modifications are intended to be within the scope of the present invention as defined in the appended claims.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave, The computer usable program code may be transmitted using any appropriate medium, including but not limited to wireless, wireline, optical fiber cable, RF, etc.

Computer program code for carrying out operations of the present invention may be coded in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, though the Internet using an Internet Service Provider).

In addition, each block of the flow chart illustrations and/or block diagrams, and combinations of blocks in the flowchart illustrations and/or block diagrams of the present invention can be implemented by computer program instructions. These computer program instructions may be provided to a processor of a general purpose computer, special purpose computer, or other programmable data processing apparatus to produce a machine, such that the instructions, which execute via the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instructions means which implement the function/act specified in the flowchart and/or block diagram block of blocks.

The computer program instruction may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which includes one or more executable instructions for implementing the specified logical function(s). It should also be noted that, in some alternative implementations, the functions noted in the block may occur out of the order noted in the figures. For example, two blocks shown in succession may, in fact be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for searching an electronic map, the method comprising the steps of:

receiving a user query entered by a user for searching the electronic map;

extracting at least one place name in the user query;

extracting, from a plurality of web pages searched on a computer network, at least one co-occurrence place name that co-occurred with the at least one place name;

selecting at least one extension place name from the at least one co-occurrence place name, thereby obtaining an extension place name set;

generating a set of queries, wherein the set of queries includes the user query, and includes a query obtained by replacing the at least one place name in the user query with each extension place name in the extension place name set, respectively;

sending the set of queries to a map search engine; and providing a single display having a map portion and a result portion;

wherein at least one of the foregoing steps is performed by a programmed data processing system;

wherein the method further comprises calling, by the map search engine, an image search engine to perform an image search on the set of queries;
wherein the method further comprises ranking preferential presentation order of images in a set of images returned by the image search engine;
wherein the ranking of the order comprises ranking a given one of the images based upon a number of co-occurrence place names in text surrounding the given image;
wherein the method further comprises at least one of: (a) removing, in response to a specified region entered by the user, at least one co-occurrence place name; and (b) removing, in response to the specified region entered by the user, at least one extension place name; and
wherein the method further comprises presenting at least some of the images in the set of images returned by the image search engine in the result portion of the display and providing in the map portion of the display a map upon which the specified region is specified by the user through a pointer device.

2. The method according to claim 1, wherein the extracting, from at least one web page, further comprises:
recognizing other place names that co-occurred with the at least one place name as co- occurrence place names.

3. The method according to claim 2, wherein the selecting further comprises selecting co-occurrence place names whose times of occurrence in web pages rank at the top as extension place names.

4. The method according to claim 1, wherein at least one place name in the user query is extracted and at least one corresponding co-occurrence place name is searched on the computer network by using Named Entity Recognition.

5. The method according to claim 1, further comprising presenting hit spots on the electronic map and associated spot images.

6. A system for searching an electronic map, the system comprising:
query receiving means for receiving a user query entered by a user for searching the electronic map;
place name extracting means for extracting at least one place name in the user query;
co-occurrence place name extracting means for extracting, from a plurality of web pages searched on a computer network, at least one co-occurrence place name that co-occurred with the at least one place name;
extension place name selecting means for selecting at least one extension place name from the at least one co-occurrence place name, thereby obtaining an extension place name set;
query set generating means for generating a set of queries, wherein the set of queries includes the user query, and includes a query obtained by replacing the at least one place name in the user query with each extension place name in the extension place name set, respectively;
query sending means for sending the set of queries to a map search engine; and
display means for providing a single display having a map portion and a result portion;
wherein the map search engine that receives the set of queries from the query set sending means calls an image search engine to perform an image search on the set of queries; wherein the system further comprises search result ranking means for ranking preferential presentation order of images in a set of images returned by the image search engine;
wherein the ranking of the order comprises ranking a given one of the images based upon a number of co-occurrence place names in text surrounding the given image;
wherein the system further comprises place name filtering means which, in response to the user entering a specified region, removes at least one of: (a) at least one co-occurrence place name; and (b) at least one extension place name; and
wherein the system further comprises means for presenting at least some of the images in the set of images returned by the image search engine in the result portion of the display and for providing in the map portion of the display a map upon which the specified region is specified by the user through a pointer device.

7. The system for searching an electronic map according to claim 6, wherein the co-occurrence place name extracting means further comprises:
means for recognizing co-occurrence place names, the co-occurrence place names being other place names in the at least one web page that co-occurred with the at least one place name.

8. The system for searching an electronic map according to claim 7, wherein the extension place name selecting means further comprises:
means for selecting co-occurrence place names whose times of occurrence in web pages rank at the top as extension place names.

9. The system for searching an electronic map according to claim 6, wherein the place name extracting means uses Named Entity Recognition to recognize the at least one place name in the user query, and the co-occurrence place name extracting means uses Named Entity Recognition to recognize place names in the web pages.

* * * * *